US007877036B2

(12) United States Patent
Kim et al.

(10) Patent No.: US 7,877,036 B2
(45) Date of Patent: Jan. 25, 2011

(54) POWER SUPPLY DEVICE AND IMAGE FORMING APPARATUS HAVING THE SAME

(75) Inventors: Dong-kyu Kim, Suwon-si (KR); Min-seon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 12/014,256

(22) Filed: Jan. 15, 2008

(65) Prior Publication Data

US 2008/0304851 A1 Dec. 11, 2008

(30) Foreign Application Priority Data

Jun. 11, 2007 (KR) ..................... 10-2007-0056697

(51) Int. Cl.
*G03G 15/00* (2006.01)
*G03G 15/02* (2006.01)
*H02J 3/00* (2006.01)
*H02M 3/335* (2006.01)

(52) U.S. Cl. .......................... 399/88; 399/37; 361/235; 307/17; 363/21.01

(58) Field of Classification Search .................. 399/37, 399/50, 53, 55, 60, 88, 89, 90, 148, 153, 399/173, 314; 323/223, 225, 324, 367; 307/17; 363/21.01
See application file for complete search history.

(56) References Cited

U.S. PATENT DOCUMENTS 4,322,786 A * 3/1982 Weber ..................... 363/21.05
4,542,349 A * 9/1985 Hoeft ......................... 330/279
4,878,143 A * 10/1989 Kalal et al. ................... 361/94
5,093,654 A * 3/1992 Swift et al. ................... 345/76
5,173,847 A * 12/1992 Suzuki .................... 363/21.14
5,499,154 A * 3/1996 Cullison ...................... 361/18
6,031,362 A * 2/2000 Bradley ...................... 323/269
6,717,389 B1 * 4/2004 Johnson ...................... 323/282
6,775,164 B2 * 8/2004 Wong et al. ................. 363/147
6,900,994 B2 * 5/2005 Asayama ................. 363/21.01
7,002,814 B2 * 2/2006 Kim et al. ................ 363/21.15
7,336,507 B2 * 2/2008 Inukai ..................... 363/21.15

(Continued)

FOREIGN PATENT DOCUMENTS

JP 61-285463 12/1986

(Continued)

OTHER PUBLICATIONS

European Search Report dated Oct. 17, 2008 issued in EP 08102952.2.

*Primary Examiner*—David M Gray
*Assistant Examiner*—Francis Gray
(74) *Attorney, Agent, or Firm*—Stanzione & Kim LLP

(57) ABSTRACT

A power supply includes a transformer to transform an input voltage into an output driving voltage for one of a plurality of components of an image forming apparatus, and an output converter to detect the driving voltage being output from the transformer, to amplify the detected driving voltage according to a power control signal, and to output the amplified driving voltage to at least one remaining component in the plurality of components of the image forming apparatus. The power supply can not only control high voltage outputs individually, but also reduces the number of switching transformers being used, as it uses at least one shared switching transformer.

24 Claims, 4 Drawing Sheets

U.S. PATENT DOCUMENTS

2001/0031160 A1 10/2001 Tanaka
2004/0096236 A1 5/2004 Shin
2004/0208667 A1* 10/2004 Nakaya ........................ 399/88
2007/0025753 A1* 2/2007 Saito et al. .................... 399/88
2007/0121350 A1* 5/2007 Duvnjak .................. 363/21.01
2008/0024092 A1* 1/2008 Cho et al. .................... 323/207
2008/0204084 A1* 8/2008 Terdan et al. ................. 327/68
2009/0115564 A1* 5/2009 Minteer ................... 336/84 M

FOREIGN PATENT DOCUMENTS

JP 61-285464 12/1986
JP 61-285465 12/1986
JP 61-285466 12/1986

* cited by examiner

POWER SUPPLY DEVICE AND IMAGE FORMING APPARATUS HAVING THE SAME

CROSS-REFERENCE TO RELATED APPLICATIONS

This application claims priority under 35 U.S.C. §119 (a) from Korean Patent Application No. 10-2007-0056697, filed on Jun. 11, 2007, in the Korean Intellectual Property Office, the disclosure of which is incorporated herein by reference in its entirety.

BACKGROUND OF THE INVENTION

1. Field of the Invention

The present general inventive concept relates to a power supply device, and an image forming apparatus having the same, and more particularly, to a power supply device to supply driving voltages to the component units of an image forming apparatus using a reduced number of transformers, and to adjust an amplitude of each of the driving voltages independently, and an image forming apparatus having the power supply device.

2. Description of the Related Art

Many electronic apparatuses generally employ a switching mode power supply (SMPS), which switches rectified and smoothed DC current derived from an AC utility source into high frequency, such as 100 kHz, to convert the power into a DC current of a different amplitude by a transformer.

Controlling the output power of the switching mode power supply generally includes pulse width modulation (PWM) control, which controls the duty cycle of switching pulses according to the desired output power, a frequency control, which controls the frequency of the switching pulses, and a phase control which controls the phase of the switching pulse.

In color printing applications, pulse width modulation is very effective in controlling transfer of color images.

One image forming apparatus includes a plurality of components, including a charger, a light exposure unit, a developer, a transfer unit, a fuser, and the like. Some of these components such as the charger and the transfer unit require a high DC driving voltage to operate. Each of the charger and the transfer unit requires a different level of power, so each level of power is typically supplied from different power supplies.

FIGS. 1A and 1B are block diagrams of conventional PWM control type power supplies. Referring to FIGS. 1A and 1B, different power supplies are provided to each of the different components and supply different levels of driving voltages as required by those components. In particular, FIG. 1A illustrates a power supply to supply driving voltage to a photoconductive medium charger, and FIG. 1B illustrates a power supply to supply driving voltage to a transfer unit.

Referring first to FIG. 1A, a power supply 10 to generate a charging voltage includes a PWM controller 11, a comparer 12, a switching transformer 13, a voltage doubler unit 14, and a charging power output unit 15.

The PWM controller 11 transmits a PWM control signal to the comparer 12 according to the level of voltage needed to perform the charging of an organic photoconductive (OPC) medium. The comparer 12 applies power to the switching transformer 13 by alternating between on and off states according to the control signal being input. The switching transformer 13 converts the alternating voltage into a level needed in the charger. Next, the voltage doubler unit 14 rectifies the output from the switching transformer 13 into the amplitude required for charging. The output unit 15 then generates a charging voltage after carrying out smoothing of the power being output from the voltage doubler unit 14.

The comparer 12 receives feedback of the charging voltage being output, so that charging power can be output to within an acceptable error range with respect to a preset reference value.

Referring to FIG. 1B, a bias transfer power generating unit includes, in a similar manner as the charging power generating unit explained above, a controller 21, a comparer 22, a switching transformer 23, a voltage doubler unit 24, and a transfer power output unit 25. The difference is that the transfer bias voltage is less in magnitude than that used in the charger, and is modulated to be supplied to the transfer unit at regular time intervals.

Differences in output power and control signals used for charging and transfer have necessitated the use of multiple power supplies. That is, conventionally, each of the components requires its own power supply.

In order to solve the problems of the conventional art described above, conventional systems use a circuit to generate transfer power directly from an output from a high voltage charging power generator without regard to the effect of variations of the power demands of one the components has on the power demands of another of the components. Since, in these systems, charging power directly influences transfer power, a change in the charging power level results in a change in the transfer power, also. Furthermore, this type of power supply system is particularly inefficient in a color printing application, which requires an increased number of components.

SUMMARY OF THE INVENTION

The present general inventive concept provides a power supply to provide components of an image forming apparatus with driving voltages using a common transformer, and to control respective amplitudes of the driving voltages independently from each other.

The present general inventive concept also provides an image forming apparatus having the above power supply.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a power supply to supply power to a plurality of components of an image forming apparatus. The power supply may include a transformer to transform input voltage to output as a driving voltage to one of the plurality of components, and an output converter to detect the driving voltage being output from the transformer, to amplify the detected driving voltage according to a power control signal, and to output the amplified driving voltage to at least one of the remaining components.

The output converter may include a voltage distributor connected to an output end of the transformer to detect the driving voltage, and to reduce the detected driving voltage, a comparer to compare the reduced driving voltage of the voltage distributor with a reference signal according to the power control signal, and to output a comparison result, and an amplifier to amplify the comparison result of the comparer and to output the amplified result to the at least one of the remaining components.

The output converter may further include a feedback processor to receive feedback of amplitude changes of the driving voltage being detected at an output end of the output converter, and to control the driving voltage to be output to the at least remaining one of the plurality of component within a predetermined acceptable error range.

The comparer may include an operational amplifier including a first input end to receive the reference signal as an input, and a second input end to receive the reduced driving voltage of the voltage distributor as an input.

The power supply may further include a feedback processor including a variable resistor to vary resistance according to the amplitude of the driving voltage being fed back from an output end of the output converter, thereby adjusting the size of the driving voltage supplied to the second input end according to the feedback, and to fix the size of the driving voltage being output to the at least one of the remaining components within the predetermined acceptable error range.

The power supply may further include a first output unit to filter the driving voltage being output from the transformer, and a second output unit to filter the driving voltage being output from the output converter.

The voltage distributor may include a first voltage distributor having at least one resistor being connected at one end thereof to an output end of the transformer, and a second voltage distributor having at least one resistor and capacitor, the second voltage being connected to another end of the resistor of the first voltage distributor.

The amplifier may include a plurality of transistors being connected in series with each other.

The foregoing and/or other aspects and utilities of the general inventive concept maybe achieved by providing an image forming apparatus to receive print data and perform printing. The image forming apparatus may include a print engine unit to perform the printing, a power supply to supply driving voltages to a plurality of components of the print engine unit, and a print controller to output a power control signal to the power supply to control the supply of driving voltages. The power supply may include a transformer to transform an input voltage and to output the transformed voltage as a driving voltage to one of the plurality of components, and an output converter to detect the driving voltage being output from the transformer, to amplify the detected driving voltage according to the power control signal, and to output the amplified driving voltage to at least one of the remaining components.

The image forming apparatus may include a voltage distributor connected to an output end of the transformer to detect the driving voltage, and to reduce the detected driving voltage, a comparer to compare the reduced driving voltage of the voltage distributor with the power control signal, and to output a comparison result, and an amplifier to amplify the comparison result of the comparer and to output the amplified result to at least one of the remaining components.

The image forming apparatus may further include a feedback processor to receive feedback of a change in amplitude of the driving voltage being detected at an output end of the output converter, and to control the driving voltage to be output to the at least one of the remaining components to within a predetermined acceptable error range.

The image forming apparatus may include an operational amplifier including a first input end to receive the reference signal as an input, and a second input end to receive the reduced driving voltage of the voltage distributor as an input.

The image forming apparatus may further include a feedback processor having a voltage-controlled resistor to vary a resistance according to the amplitude of the driving voltage being fed back from an output end of the output converter, thereby adjusting the amplitude of the driving voltage supplied to the second input end of the operational amplifier, and to control the amplitude of the driving voltage being output to the at least one of the remaining components to within a predetermined acceptable error range.

The image forming apparatus may further include a first output unit to filter the driving voltage being output from the transformer, and a second output to filter the driving voltage being output from the output converter.

The voltage distributor may include a first voltage distributor having at least one resistor being connected to an output end of the transformer, and a second voltage distributor having at least one resistor and capacitor, the second voltage being connected to the other end of the resistor of the first voltage distributor.

The amplifier may include a plurality of transistors being connected in series with each other.

The foregoing and/or other aspects and utilities of the present general inventive concept can also be achieved by providing a power supply of an image forming having a first power unit to modulate a DC voltage in accordance with a first voltage control signal provided thereto and to generate therefrom a first output voltage, and a second power unit to generate a second output voltage from the first output voltage in accordance with a second voltage control signal provided thereto and a feedback voltage from the second output voltage.

The foregoing and/or other aspects and utilities of the present general inventive concept can also be achieved by providing an image forming apparatus having a print controller to control a plurality of components to form an image and to generate a first voltage control signal and a second voltage control signal independently one from another according to voltage requirements of respective ones of the components. The image forming apparatus may have a first power unit to modulate a DC voltage in accordance with the first voltage control signal and to generate therefrom a first output voltage to provide to one of the plurality of components, and a second power unit to generate an independently controlled second output voltage from the first output voltage to provide to at least one other of the components. The second output voltage may have an amplitude controlled by the second voltage control signal and a feedback voltage of the second output voltage.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
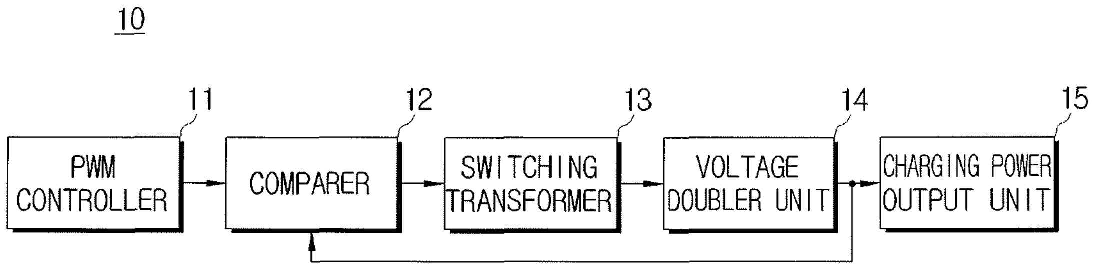
FIG. 1A (RELATED ART)
FIGS. 1A and 1B are block diagrams of conventional pulse width modulation (PWM) type power supplies.
Figure 1B:
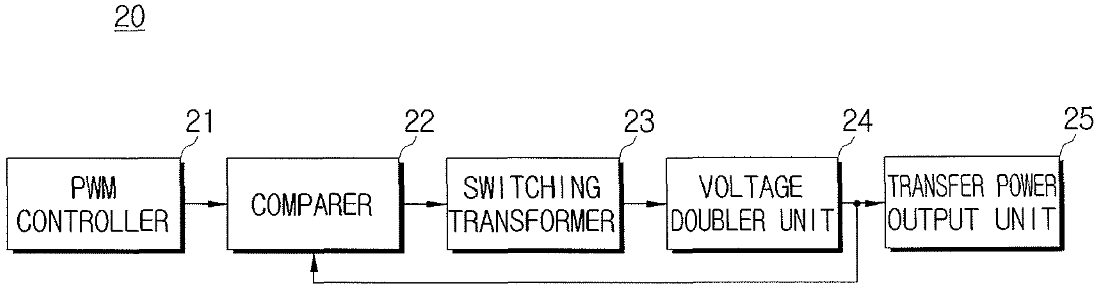
FIG. 1B (RELATED ART)

Reference will now be made in detail to embodiments of the present general inventive concept, examples of which are illustrated in the accompanying drawings, wherein like reference numerals refer to the like units throughout. The exemplary embodiments are described below in order to explain the present general inventive concept by referring to the figures.

Figure 2:
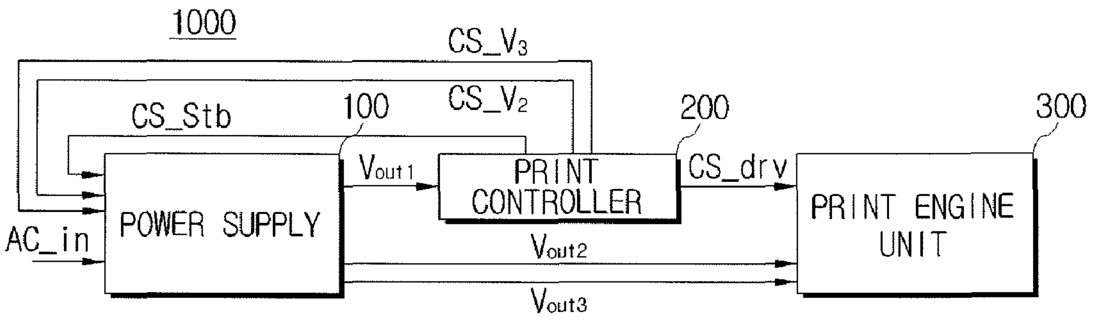
FIG. 2 is a block diagram of an image forming apparatus according to an exemplary embodiment of the present general inventive concept.

FIG. 2 is a block diagram of an image forming apparatus according to an exemplary embodiment of the present general inventive concept.

Referring to FIG. 2, an image forming apparatus 1000 includes a power supply unit 100, a print controller 200 and a print engine unit 300. It is to be understood that the exemplary image forming apparatus 1000 may include components other than those illustrated to perform, for example, various image forming process, but such have been omitted from the figures so as to avoid undue complexity therein, as well as in the corresponding descriptions thereof.

The exemplary power supply unit 100 generates high voltage outputs, including a first output voltage and a second output voltage, from externally supplied power AC_in in response to a power control signal of the print controller 200.

The power supply unit 100 may include a switching mode power supply (SMPS) to convert the external AC power into DC power, and to reduce or increase the converted DC power to predetermined voltage levels.

The power supply unit 100 provides the components of the print engine unit 300, including a transfer unit, a charger, a developer, and a fuser, with the reduced or amplified DC power.

A bridge rectification circuit (not illustrated) may be implemented to convert AC power to an original DC power level, which may then modulated by, for example, a chopping circuit controlled by a suitable PWM controller. The modulated voltage may then be provided to a switching transformer to undergo an amplitude transformation according to a turns ratio in the transformer.

The exemplary power supply unit 100 receives AC input power (AC_in), generates a plurality of DC output voltages and provides the voltages at respective output terminals. The power supply unit 100 according to the exemplary embodiment of the present general inventive concept provides both the print controller 200 and the print engine unit 300 with power. The print controller 200 may be configured to include a micro-controller and circuit elements connected to the micro-controller. The exemplary power supply unit 100 provides regulated voltage (Vout1) to the constituent elements of the print controller 200.

The power supply unit 100 also provides components of the print engine unit 300 with corresponding operating voltages. If a driving voltage of a charger to charge an OPC medium requires −1700V, and a driving voltage of a transfer unit to attract charged toner particles to requires −900V, the power supply unit 100 generates first and second voltages (Vout2, Vout3) according to these amplitudes, to within an acceptable error range.

In the illustrated example, the first output voltage (Vout2) may be provided to the charger, and the second output voltage (Vout3) may be provided to the transfer unit.

The power supply 100 may use a single switching transformer to generate charging and transfer powers.

In order to output power to within an acceptable error range relative to a preset reference value set by the print controller 200, the power supply unit 100 may receive feedback signals of the first and second output powers and may adjust the amplitudes accordingly. The first and second output voltages may be rectified and smoothed before being output. A detailed structure of an exemplary power supply unit 100 will be explained below.

The exemplary print controller 200 generates a driving control signal (CS_drv) to control the overall function of the image forming apparatus 100. In other words, the print controller 200 controls the print engine unit 300 through its various operations including loading and feeding of print media, imaging of print data onto a print medium, fusing of the image, and discharging of printed matter, and also monitors the driving status of the image forming apparatus 1000 to determine, for example, whether a paper jam or print error has occurred.

The exemplary print controller 200 generates and outputs power control signals CS_V2 and CS_V3 to control the power supply unit 100 to generate charging power and transfer bias power, respectively. Additionally, a power control standby signal (CS_stb) may be automatically reset prior a printing process, or if print data processing is completed in the print controller 200, or the power control standby signal (CS_stb) may be automatically set to conserve power in the image forming apparatus 1000 when no printing is being performed.

The print controller 200 may also vary the amplitudes of the first and second output voltages being generated at the power supply unit 100, when it is necessary to change, for example, the charging power or the transfer power in response to the varying printing environments. For example, the power provided to the transfer unit and the power provided to the charger may be changed appropriately to form a clearer image according to characteristics of the paper. The print controller 200 may generate a signal to cause the first and second output powers to vary according to designed amplitudes, respectively.

In a laser printer application, the print engine unit 300 may include a laser scanning unit (LSU) to irradiate an OPC drum with a laser beam, a developer, a fuser, etc. In this implementation, the components of the print engine unit 300 are driven by the first and second output voltages from the power supply unit 100 and by the driving control signal (CS_drv) output from the print controller 200, so as to form an image on the printing medium corresponding to the print data.

Figure 3:
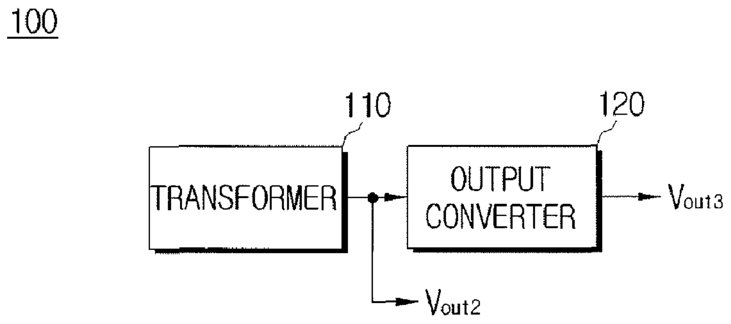
FIGS. 3 and 4 are block diagram of power supply units of FIG. 2 according to exemplary embodiments of the present general inventive concept.

FIG. 3 is a block diagram illustrating the power supply unit 100 of FIG. 2 according to an exemplary embodiment of the present general inventive concept. Referring to FIG. 3, the power supply unit 100 includes a transformer 110 and an output converter 120. It is to be understood that the power supply 100 can be implemented as a separate module from the image forming apparatus 1000, and will be referred to as power supply 100 in the explanation set forth below.

The transformer 110 transforms an input voltage and outputs a driving voltage to one of a plurality of components of the image forming apparatus 1000. More specifically, the transformer 110 may convert modulated DC power provided thereto into another level of modulated DC power, which may be rectified, filtered and supplied as driving voltages to the respective components of the image forming apparatus 1000. For example, the driving voltages being supplied from the transformer 110 may be supplied to the charger as the first output voltage Vout2. The level of the first output voltage Vout2 may be controlled by a control signal CS_V2 from the print controller 200.

The output converter 120 receives the driving voltage output from the transformer 110, processes the received driving voltage according to a power control signal CS_V3, and outputs the processed driving voltage Vout3 to at least one of the remaining components of the image forming apparatus 1000. For example, if the output driving voltage from the transformer 110 is used in charging, the charging voltage may be processed and used as a voltage Vout3 provided to the transfer unit, which is less in magnitude than the charging voltage. The voltage may also be used as the driving voltage for the developer or LSU.

In the afore-discussed processing, the amplitude of the driving voltage Vout3 from the output converter 120 may be controlled according to the power control signal CS_V3 output from the print controller 200. Thus, the relative amplitudes of Vout2 and Vout3 may be under control of the print controller 200, and the difference in amplitude can be adjusted dynamically according to such factors as media type and paper resistance, among others.

Figure 4:
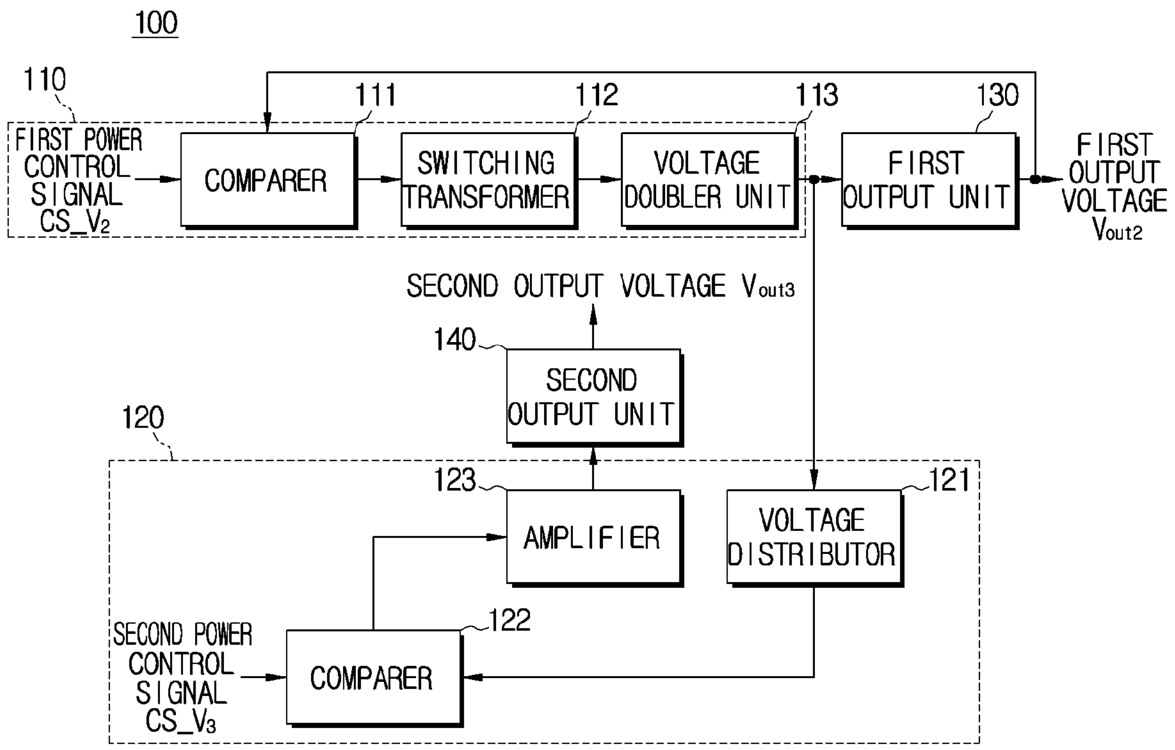

FIG. 4 is a block diagram of a power supply according to another exemplary embodiment of the present general inventive concept. Referring to FIG. 4, the exemplary power supply includes a transformer 110, an output converter 120, a first output unit 130, and a second output unit 140.

The exemplary transformer 110 includes a comparer 111, a switching transformer 112, and a voltage doubler unit 113. The comparer 111 receives feedback of charging power being output from the first output unit 130 and makes a comparison with a first power control signal CS_V2 output from the print controller 200. The resultant modulated voltage from the comparer 111 is input to the switching transformer 112 and converted into a modulated voltage of a level suitable to be used at a charger. The switching transformer 112 uses a single transformer to transform the input power to an amplitude appropriate to a charger. The converted power is rectified in the voltage doubler unit 113.

The first output unit 130 may filter and process the rectified power from the voltage doubler unit 112. In particular, the first output unit 130 filters the driving voltage being generated at the transformer 110 and to output a stable and constant DC voltage that can be used at the charger.

The exemplary output converter 120 includes a voltage distributor 121, a comparer 122, and an amplifier 123.

The voltage distributor 121 is connected to an output end of the transformer 110 to detect driving voltage of the transformer 110, and to reduce the detected driving voltage using, for example, a distributed resistance. In certain embodiments of the present general inventive concept, the output driving voltage from the transformer 110 is greater than 1000 VDC, and the circuit of the voltage distributor 121 must withstand a high voltage to reduce the charging voltage to the level of the transfer voltage, which may be greater than 500 VDC, but less than the charging voltage.

The comparer 122 compares the driving voltage reduced at the voltage distributor 121 with a reference signal according to a second power control signal CS_V3, and outputs a result. For example, the comparer 122 may use an operational amplifier, or op-amp, which includes a first input to receive a reference signal and a second input to receive a feedback signal of the driving voltage at the output of the voltage distributor 121, and to control the output voltage level accordingly.

The comparer 122 detects any changes in amplitude of the driving voltage at the output end of the output converter 120 through feedback so as to output a driving voltage to at least one of the remaining components of the print engine unit 300 with the amplitude thereof within an acceptable error range.

The amplifier 123 amplifies the output of the comparer 122 and outputs a result. The amplifier 123 amplifies the voltage to the level necessary for the transfer operation in the print engine unit 300. A plurality of transistors may be implemented in the amplifier to increase the voltage gain for more accurate control of the amplified voltage. Transistors, such as PNP transistors or NPN transistors, may be used.

The second output unit 140 filters the driving voltage being output from the output converter 120. In particular, the second output unit 140 filters the driving voltage being generated at the output converter 120 so that the voltage Vout3 provided to the transfer unit is maintained at a stable level.

Figure 5:
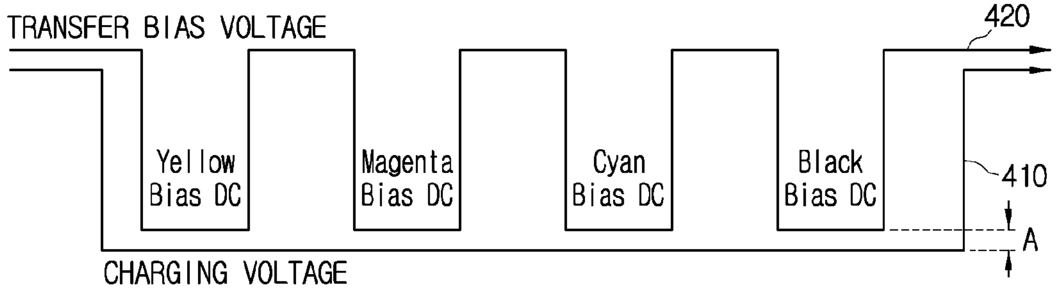
FIG. 5 is a graphical representation of a driving voltage waveform being output from a power supply unit according to an exemplary embodiment of the present general inventive concept.

FIG. 5 is a graphical representation of waveforms used in the printing engine 300 according to an exemplary embodiment of the present general inventive concept.

In particular, FIG. 5 illustrates the output voltages explained above in the graphical representations of charging voltage output 410 corresponding to the first output voltage Vout2, and transfer bias voltage output 420 corresponding to the second output voltage Vout3.

If the charging voltage output 410 is incorporated into the image forming apparatus 1000, the image forming apparatus 1000 may operate in a manner that high voltage charging power is supplied to the charger at any time as needed. Regarding the transfer bias voltage output 420, because it is generated by transforming the charging power output 410, the transfer bias voltage output 420 is smaller in amplitude than the charging power output 410 by an amount A that may be controlled by the voltage controller 200. The exemplary transfer bias voltage 420 is modulated according the order of color developing operations, that is, in the order of yellow, magenta, cyan and black transfer. In certain embodiments of the present general inventive concept, the second output voltage Vout3 is provided to the printing engine 300 at a constant level, and is modulated as transfer bias power 420 in the printing engine in accordance with a component of the driving signal CS_drv generated by the print controller 200.

When the image forming apparatus 1000 is in standby mode or in power save mode, PWM may be deactivated, and, consequently, power is not generated by the power supply. In this case, because power of the transfer unit is not used, transfer bias power is set to 0.

Figure 6:
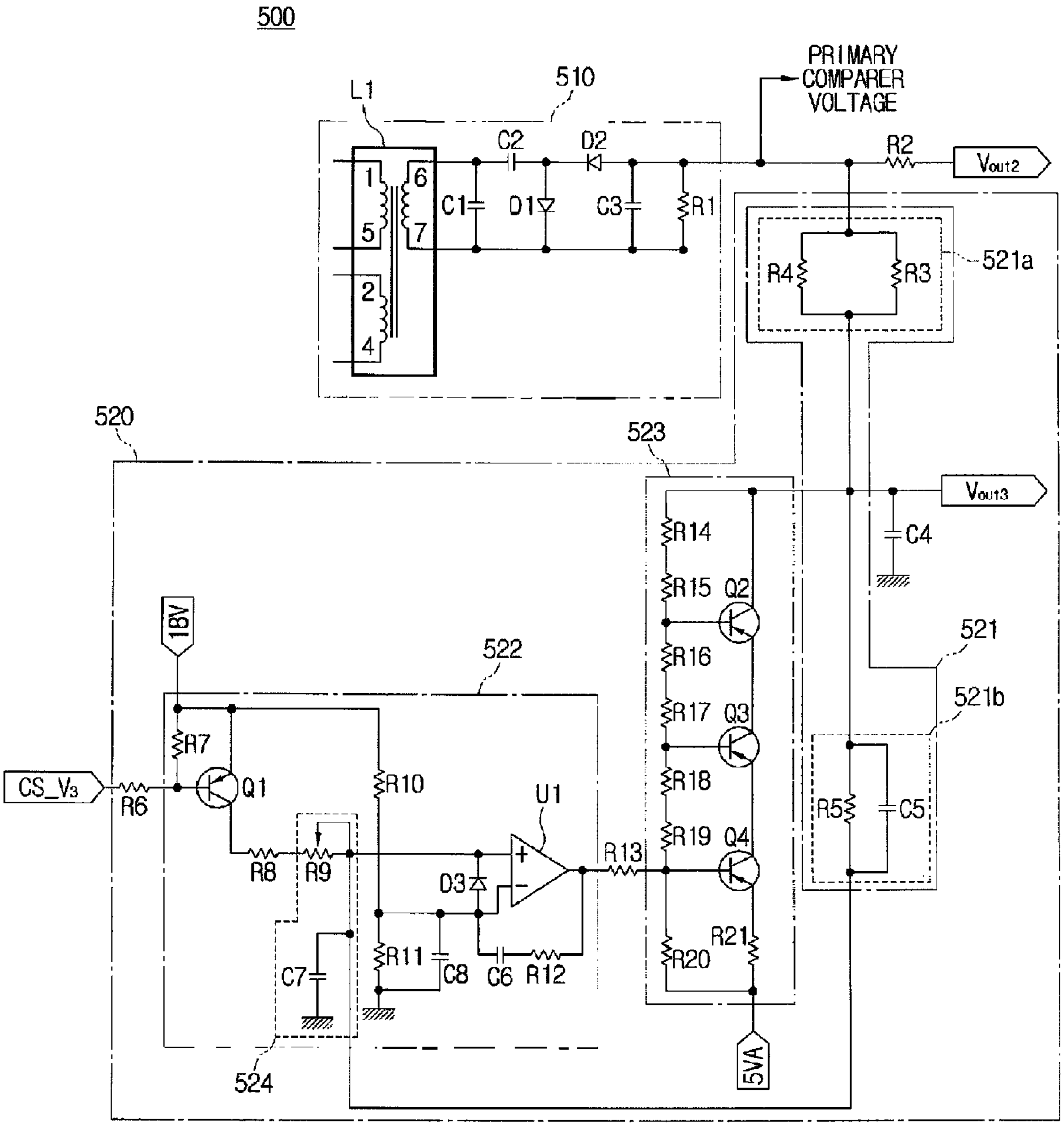
FIG. 6 illustrates a circuit of the power supply unit of FIG. 4 according to an exemplary embodiment of the present general inventive concept.

FIG. 6 illustrates portions of a circuit of the exemplary power supply unit, such as that illustrated in FIG. 4, according to an exemplary embodiment of the present general inventive concept.

Referring to FIG. 6, the power supply 500 includes a transformer circuit 510 and an output converter 520. It is to be noted that only the secondary side of the transformer circuit is illustrated and discussed to avoid congesting the figure. The primary side circuit may be implemented and controlled in a suitable manner, including conventional methods consistent with the descriptions above. For example, an exemplary feedback node at the output of the transformer circuit 510 is illustrated in FIG. 6 as being directed toward a comparer 111 (not illustrated in FIG. 6).

The exemplary transformer circuit 510 transforms a switched voltage derived from the power fed to the image forming apparatus 1000, using a single transformer L1, and rectifies and smoothes the voltage from the secondary side of transformer L1 into DC output power as the first output voltage Vout2. It is to be noted that the capacitors C1-C3 and diodes D1-D2 perform the functions of the voltage doubler unit 113, e.g., rectification, as well as the functions of first output unit 130, e.g., filtering.

The exemplary output converter 520 includes a voltage distributor 521, a comparer 522, and an amplifier 523.

The voltage distributor 521 may include first and second distributors 521*a*, 521*b*. The first and second distributors 521*a*, 521*b* may reduce the driving voltage Vout2 from the transformer 110 at the output of the voltage distributor 521 as the second output voltage Vout3. The voltage distributor 521 may include a resistor having a high voltage rating to reduce the driving voltage Vout2. The first distributor 521*a* may be connected between a node at an output end of the transformer 510 and the second distributor 521*b*. The first distributor 521*a* may be implemented as a plurality of high-voltage resistors, such as resistors R3 and R4 in parallel to distribute the current passing through the first distributor 521*a* that causes the high voltage drop.

The second voltage distributor 521*b* may operate to reduce output power from the transformer 510 in the feedback path of the comparer 522. The second voltage distributor 521*b* may be implemented as a resistor R5. The second voltage distributor 521*b* may be connected at one end thereof to the first voltage distributor 521*a* and the second output unit 140, and at the other end thereof to the comparer 522. A capacitor C5 may additionally provided across the resistor R5 to allow sudden amplitude changes in Vout3 to pass to the feedback processor 524 discussed below.

The comparer 522 may include a comparator, such as an op-amp U1, in the feedback circuit. The op-amp includes a first input end to which a reference signal of the image forming apparatus 1000 is input, and a second input end to which the feedback of the driving voltage Vout3 is input. The comparer 522 generates a comparison signal that corresponds to a difference between a transfer bias control signal CS_V3 of the image forming apparatus 1000 and the level of the output voltage Vout3.

The comparer 522 may include a feedback processor 524 which receives, by way of the feedback path, an indication of a change in amplitude of the driving voltage Bias DC, and fixes the amplitude of driving voltage Vout3 to within a predetermined acceptable error range.

The feedback processor 524 may be implemented as a voltage-controlled resistor which changes resistance according to the amplitude of the driving voltage being fed back from the output end of the output converter 520, and adjusts the amplitude of the driving voltage being supplied to the second input end of the comparer 552 according to the feedback, so that the driving voltage being output to at least one of the remaining components can be controlled to within a predetermined acceptable error range. It is to be understood that the voltage-controlled resistor R9 may be implemented by conventional techniques, such as through a junction field effect transistor (JFET) circuit.

As an alternative example to the circuit illustrated in FIG. 6, the feedback processor 524 may be implemented by a variable resistor R9, to provide means of adjusting the difference between the power control signal CS_V3 and the amplitude of driving voltage Vout3. The feedback processor 524 may fix the amplitude of the driving voltage Vout3 being output to at least one of the remaining components to within the predetermined acceptable error range. Accordingly, even when voltage Vout2 being supplied to the charger via the transformer 510 varies, the driving voltage Vout3 being supplied to the other components, such as transfer unit, can be maintained at the correct level.

The amplifier 523 may include a plurality of amplification elements. In the circuit employed in the example embodiment, three PNP transistors serve to increase the gain, and are responsive to the output of the comparer 522.

Accordingly, one switching transformer can not only output charging power and transfer bias power, but the voltage outputs are independently controllable such that the relative difference in amplitude of the voltages Vout2 and Vout3 can be dynamically adjusted, as discussed with reference to FIG. 5. For example, the print controller may adjust the individual first and second control signals CS_V2 and CS_V3 to establish a difference in voltage levels between the charger and the transfer unit.

As explained above, according to the example embodiments of the present general inventive concept, at least one shared transformer is used to provide driving voltages to the components of an image forming apparatus, and to control the amplitudes of the driving voltages independently. As a result, manufacture cost of power supply and image forming apparatus employing the power supply can be reduced. In particular, a more stable supply of power to the components is guaranteed, because outputs to the components are controllable individually, and adjustable through independent feedback.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus to receive print data and perform printing, comprising:

a print engine unit to perform the printing;

a print controller to output a power control signal to control driving voltages provided to the print engine unit; and a power supply to supply the driving voltages to a plurality of components of the print engine unit, the power supply comprising:

a transformer to transform an input voltage and to output the transformed voltage as one of the driving voltages to one of the plurality of components, and an output converter to detect the driving voltage being output from the transformer, to amplify the detected driving voltage according to the power control signal, and to output the amplified driving voltage to at least one of the remaining components.

2. The image forming apparatus of claim 1, wherein the output converter comprises:

a voltage distributor connected to an output end of the transformer to detect the driving voltage, and to reduce the detected driving voltage;

a comparer to compare the reduced driving voltage of the voltage distributor with the power control signal, and to output a comparison result; and an amplifier to amplify the comparison result of the comparer and to output the amplified result to at least one of the remaining components.

3. The image forming apparatus of claim 2, wherein the output converter further comprises:

a feedback processor to receive feedback of a change in amplitude of the driving voltage being detected at an output end of the output converter, and to control the driving voltage to be output to the at least remaining one of the plurality of components within a predetermined acceptable error range.

4. The image forming apparatus of claim 2, wherein the comparer comprises:

an operational amplifier comprising a first input end to receive the reference signal as an input, and a second input end to receive the reduced driving voltage of the voltage distributor as an input.

5. The image forming apparatus of claim 4, further comprising:

a feedback processor comprising a voltage-controlled resistor to vary a resistance according to the amplitude of the driving voltage being fed back from an output end of the output converter, thereby adjusting the amplitude of the driving voltage supplied to the second input end of the operational amplifier to control the amplitude of the driving voltage being output to the at least one of the remaining components to within a predetermined acceptable error range.

6. The image forming apparatus of claim 1, further comprising:

a first output unit to filter the driving voltage being output from the transformer; and a second output unit to filter the driving voltage being output from the output converter.

7. The image forming apparatus of claim 2, wherein the voltage distributor comprises:

a first voltage distributor having at least one resistor being connected to an output end of the transformer; and a second voltage distributor having at least one resistor and capacitor, the second voltage being connected to another end of the resistor of the first voltage distributor.

8. The image forming apparatus of claim 2, wherein the amplifier comprises:

a plurality of transistors being connected in series with each other.

9. A power supply of an image forming apparatus comprising:

a first power unit to modulate a DC voltage in accordance with a first voltage control signal provided thereto and to generate therefrom a first output voltage; and a second power unit to generate a second output voltage from the first output voltage in accordance with a second voltage control signal provided thereto and a feedback voltage from the second output voltage.

10. An image forming apparatus comprising:

a print controller to control a plurality of components to form an image and to generate a first voltage control signal and a second voltage control signal independently one from another according to voltage requirements of respective ones of the components;

a first power unit to modulate a DC voltage in accordance with the first voltage control signal and to generate therefrom a first output voltage to provide to one of the plurality of components; and a second power unit to generate an independently controlled second output voltage from the first output voltage to provide to at least one other of the components, the second output voltage having an amplitude controlled by the second voltage control signal and a feedback voltage of the second output voltage.

11. The image forming apparatus of claim 10, wherein the first power unit includes a transformer to receive the modulated DC voltage and to provide an output modulated voltage from which the first output voltage and the second output voltage are generated.

12. The image forming apparatus of claim 11, wherein the first output voltage is maintained by a feedback voltage thereof provided to a primary side of the transformer.

13. The image forming apparatus of claim 12, wherein the feedback voltage from the second output voltage is provided to a secondary side of the transformer.

14. The image forming apparatus of claim 10, further comprising:

a voltage distributor electrically interposed between an output of the first power unit at which the first output voltage is provided and an output of the second power unit at which the second output voltage is provided.

15. The image forming apparatus of claim 14, wherein the voltage distributor includes a second voltage distributor circuit coupled to the output of the second power unit in a feedback path through which the feedback voltage of the second output voltage is provided.

16. The image forming apparatus of claim 15, wherein the second voltage distributor circuit includes a resistor and a capacitor in parallel connection in the feedback path.

17. The image forming apparatus of claim 16 further comprising:

a variable resistor in the feedback path to process the feedback voltage to be compared with the second voltage control signal.

18. The image forming apparatus of claim 17, wherein the resistive element is a voltage controlled resistor.

19. The image forming apparatus of claim 18, wherein the second power unit includes an amplifier to generate the second output voltage responsive to a comparison of the second voltage control signal provided thereto and the feedback voltage from the second output voltage.

20. The image forming apparatus of claim 19, wherein the amplifier includes a plurality of series connected amplification elements.

21. The image forming apparatus of claim 20, wherein the series connected amplification elements include transistors respectively interconnected emitter to collector.

22. The image forming apparatus of claim 21, wherein the one of the components is a charger of a photoconductive medium and the other of the components is a transfer unit.

23. The image forming apparatus of claim 22, wherein the first power unit and the second power unit independently control and generate the first output voltage and the second output voltage, respectively.

24. The image forming apparatus of claim 23, wherein the second power unit controls and generates the second output voltage without affecting an amplitude of the first output voltage.

* * * * *